United States Patent
Cohn et al.

(10) Patent No.: US 10,079,881 B2
(45) Date of Patent: Sep. 18, 2018

(54) DEVICE SELF-SERVICING IN AN AUTONOMOUS DECENTRALIZED PEER-TO-PEER ENVIRONMENT

(71) Applicant: International Business Machines Corporation, Armonk, NY (US)

(72) Inventors: John M. Cohn, Richmond, VT (US); Sumabala P. Nair, Johns Creek, GA (US); Sanjay B. Panikkar, Bangalore (IN); Veena S. Pureswaran, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 15/198,764

(22) Filed: Jun. 30, 2016

(65) Prior Publication Data

US 2018/0007131 A1     Jan. 4, 2018

(51) Int. Cl.
*G06F 15/177* (2006.01)
*H04L 29/08* (2006.01)
*H04L 12/24* (2006.01)

(52) U.S. Cl.
CPC ...... *H04L 67/1068* (2013.01); *H04L 41/5051* (2013.01); *H04L 67/12* (2013.01); *H04L 67/16* (2013.01); *H04L 67/303* (2013.01)

(58) Field of Classification Search
CPC ............. H04L 67/1068; H04L 41/5051; H04L 67/303; H04L 67/16; H04L 67/12
See application file for complete search history.

(56) References Cited

U.S. PATENT DOCUMENTS

| | | | |
|---|---|---|---|
| 8,680,983 B2 | 3/2014 | Ebrom et al. | |
| 2003/0041141 A1* | 2/2003 | Abdelaziz | G06F 9/4416 709/223 |
| 2004/0064568 A1* | 4/2004 | Arora | H04L 29/06 709/228 |
| 2004/0064693 A1* | 4/2004 | Pabla | H04L 63/02 713/168 |
| 2004/0098447 A1* | 5/2004 | Verbeke | G06F 9/5055 709/201 |
| 2015/0244690 A1 | 8/2015 | Mossbarger | |
| 2016/0065597 A1 | 3/2016 | Nguyen et al. | |

FOREIGN PATENT DOCUMENTS

| | | |
|---|---|---|
| EP | 2530551 A1 | 12/2012 |
| WO | 2015175722 A1 | 11/2015 |

\* cited by examiner

*Primary Examiner* — Krisna Lim
(74) *Attorney, Agent, or Firm* — Gilbert Harmon, Jr.

(57) ABSTRACT

An approach, for autonomous self-servicing of decentralized peer-to-peer devices in an autonomous decentralized peer-to-peer telemetry (ADEPT) environment. A first ADEPT peer connects to ADEPT peers based on peer consensus. The first ADEPT peer determines service needs based on receiving diagnostic inputs. The first ADEPT peer identifies service providers based on consensus service contracts associated to the service needs. The first ADEPT peer creates service orders based on the service providers and output the service orders to service providers based on the consensus service contracts.

20 Claims, 6 Drawing Sheets

US 10,079,881 B2

DEVICE SELF-SERVICING IN AN AUTONOMOUS DECENTRALIZED PEER-TO-PEER ENVIRONMENT

BACKGROUND OF THE INVENTION

The present invention relates generally to the field of Internet of Things (IoT) and more particularly, to device self-servicing enablement in an autonomous decentralized peer-to-peer telemetry (ADEPT) environment An "Internet of Things" (IoT) can be a group of physically tangible electronic or computerized "things" that can be capable of network connectivity. Examples of IoT devices (e.g., "things") can comprise environmental sensors, mobile devices, motion detectors, security cameras and "smart" appliances. Further, IoT devices can be equipped with a plurality of network interfaces, computer processors and local user interfaces.

IoT sensor devices can collect data through sensors, cameras or other monitoring techniques and can transmit data continuously, frequently or in response to, an occurrence of a triggering condition, to one or more remote IoT controllers through a network. IoT devices can perform functions such as, but not limited to, reporting a status of an appliance, an environmental controller or a motion sensor. IoT devices can also send instructions to a monitored device in response to monitored data or in response to instructions received from the IoT controller over a network.

IoT controllers are often centralized and perform functions such as, but not limited to, authentication and registration of IoT devices, messaging, file management, Quality of Service (QoS) coordination and life cycle management. Different IoT solution vendors can provide proprietary solutions that follow similar centralized architectures and centralized IoT controllers can be hosted on a cloud environment.

Some centralized IoT solutions can enable extension of some processing to the edge (i.e., edge computing) where edge computing can comprise applications, data and services received from centralized nodes to enable analytics and knowledge generation at the source of the data, but where those resources may not be continuously connected to a network. These described IoT edge services often function as spokes of a cloud controller that perform aggregation and regional tasks to have data further aggregated and controlled at the central controller. While central control can be efficient for high-value IoT applications, a centralized model can become expensive to support for a large number (e.g., billions) of low value IoT devices over a long lifecycle (e.g., years). Additionally, IoT devices on the edge can have increased capability and sophistication when IoT devices comprise significant computing and memory capability. Sophisticated IoT devices can be leveraged to complement centralized solutions by enabling decentralized peer-to-peer networked devices to perform self-service tasks such as, but not limited to, self-diagnosis, predict equipment failure and anticipate service needs.

SUMMARY

As disclosed herein, a method, for autonomous self-servicing of decentralized peer-to-peer devices in an autonomous decentralized peer-to-peer telemetry (ADEPT) environment, the method comprising: connecting, by a first ADEPT peer, to one or more ADEPT peers based on peer consensus; determining, by the first ADEPT peer, one or more service needs based on receiving one or more diagnostic inputs; identifying, by the first ADEPT peer, one or more service providers based on one or more consensus service contracts associated to the one or more service needs; creating, by the first ADEPT peer, one or more service orders based on the one or more service providers and outputting, by the first ADEPT peer, the one or more service orders to one or more service providers based on the one or more consensus service contracts. A computer system and a computer program product corresponding to the above method are also disclosed herein.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
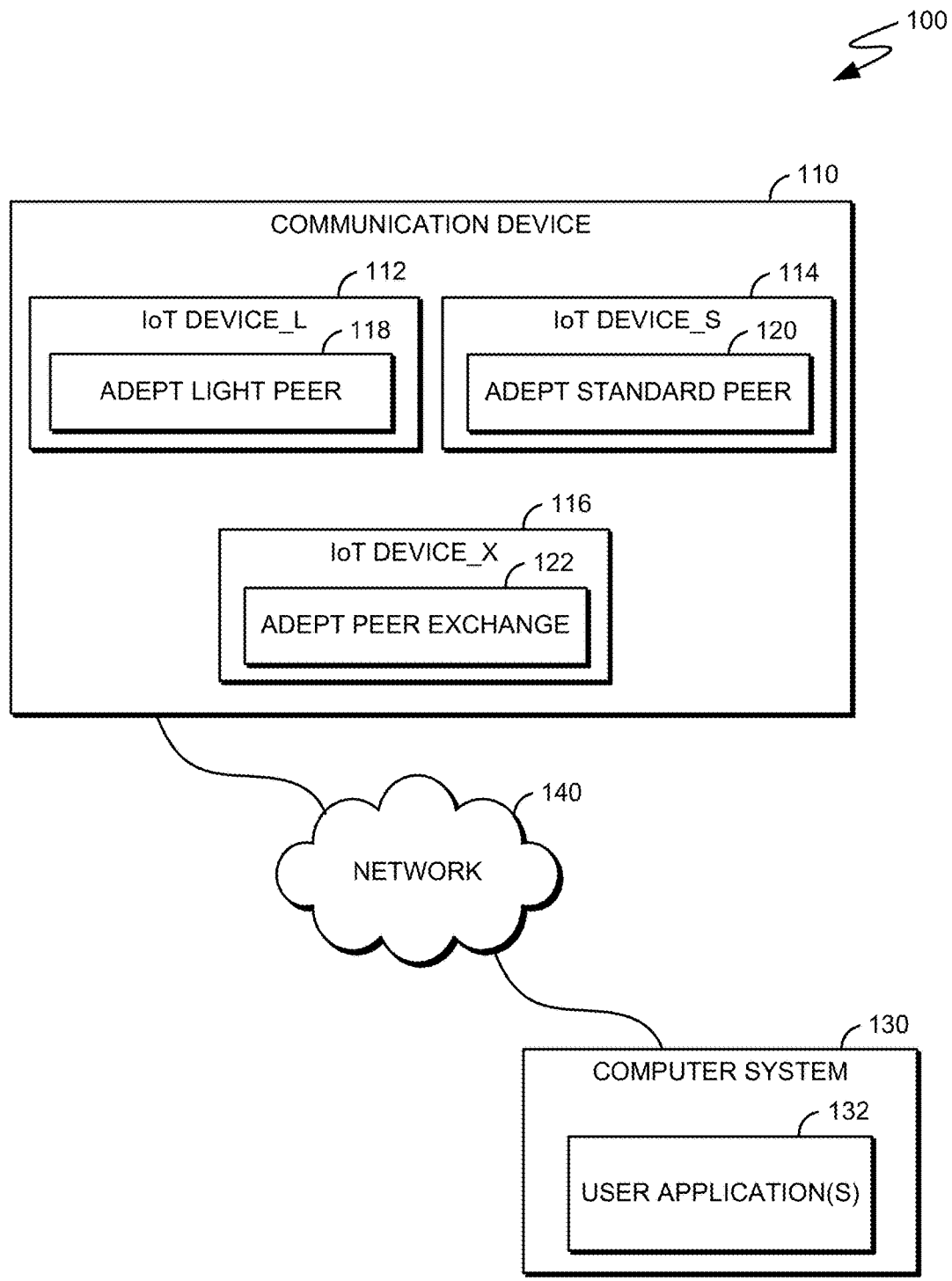
FIG. 1 depicts a functional block diagram illustrating a computing environment, in accordance with an embodiment of the present invention.

Aspects of the present disclosure and certain features, advantages and details thereof, are explained more fully below with reference to the non-limiting examples illustrated in the accompanying figures. Descriptions of well-known materials, fabrication tools, processing techniques, etc., are omitted to avoid obscuring the disclosure with unnecessary detail. It should be understood, however, that the detailed description and the specific examples, while indicating aspects of the invention, are given by way of illustration only and not by way of limitation. Various substitutions, modifications, additions and/or arrangements, within the spirit and/or scope of the underlying inventive concepts will be apparent to those skilled in the art from this disclosure.

Embodiments of the present invention provide systems, methods, and computer program products by which IoT devices can engage in device controlled self-servicing based on foundational IoT trusted transactions in a peer-to-peer and decentralized manner comprising an Autonomous Decentralized Peer-to-peer Telemetry (ADEPT) architecture. Elements of embodiments of the present invention can comprise peer-to-peer messaging, distributed file sharing and autonomous device coordination to enable peer-to-peer trust and negotiate service contracts between trading partners (e.g., ADEPT networked devices and service providers).

Peer-to-peer messaging can comprise devices in a network that can communicate using peer-to-peer messaging. Depending on the nature of interaction and relationship between devices, peer-to-peer messaging can comprise simple notifications and/or can trigger more complex actions between devices. Example uses of peer-to-peer messaging can comprise functions such as, but not limited to, device notification toward an owner/user, device requests toward other devices and remote authentication of other network accessible devices (e.g., physical equipment, service providers).

Distributed file sharing can comprise devices in a network that share a range of files and/or portions of files using one or more connected devices. File sharing protocols such as, but not limited to, BitTorrent by BitTorrent, Inc., when used with peer-to-peer messaging, provides a mechanism for achieving a peer-to-peer IoT network. Examples of distributed file sharing usage comprise functions such as, but not limited to, transfer of analytics reports, sharing content and distributing software/firmware updates. Further, distributed file sharing can establish capability for an IoT device to maintain its own data and thereby reduces the need for centralized infrastructure and the associated costs of maintaining data of low-value IoT devices. It should be noted that an IoT device life-span can surpass a centralized infrastructure owner. For example, a manufacturer of an IoT door lock may go out of business and the central cloud interactions with the device could be disabled. While the IoT door lock could have a long life, the loss of a centralized infrastructure could limit the door lock function. When an IoT device is responsible for its own data such as, but not limited to, identification data and service history, an IoT device can realize independence from a centralized infrastructure.

Autonomous IoT device coordination operates in the absence of a centralized controller acting as a broker and arbiter between IoT devices. Embodiments of the present invention can comprise a consensus based architecture to create trust in a "trustless" network, verify transactions and manage roles and/or responsibilities of IoT devices on a peer-to-peer network. A "trustless" network can be defined as devices interconnected without referencing a central authentication authority. Further, consensus can be defined as a plurality of interconnected devices agreeing that a plurality of distributed data of interest matches amongst the plurality of interconnected devices. Embodiments of the present invention can use technology such as, but not limited to, blockchain by bitcoin organization (bitcoin.org) as a decentralization mechanism to achieve autonomous IoT device coordination and/or consensus. Blockchain is an example technology that can establish trust, accountability and transparency when transacting and/or interacting with applications. Blockchains can be stored on a plurality of computing devices to eliminate reliance on a central authentication control authority. Blockchain can be described as a record and/or ledger of digital events where a blockchain can comprise one or more transactional agreements between trading partners for a product and/or service that can be verified as authentic. Authenticity of a blockchain exchange is verified by consensus agreement among a collection of devices that ledger copies stored on those devices match.

Further, blockchain data can represent identifiable logical value (e.g., digital currency, crypto-currency, etc.) that can be transferred between computing devices, in exchange for goods and/or services. The ability to establish trust through consensus (e.g., distributed ledger), enables the ability to perform a wide range of digital transactions that can be tracked and traded without requiring a central point of control and can establish the ability for IoT devices to operate autonomously. Examples of autonomous IoT device coordination between IoT devices can comprise registration, authentication of IoT devices, establishing rules of engagement based on proximity and/or peer consensus (e.g., agreement), negotiating complex contracts and/or checklists between IoT devices and mechanizing digital currency for monetary value exchanges.

In embodiments of the present invention, different IoT devices can perform different functions based on their capability. For illustrative purposes, ADEPT IoT devices are classified by three category types based on degrees of functional capabilities. Functional capabilities can vary based on the type of function an IoT device is instrumented for and may be classified as a hybrid of the three designated ADEPT peer types. The ADEPT peer types are identified as light peer, standard peer and peer exchange where each respective peer type can have increasing capability and/or functionality. The architecture of ADEPT can comprise custom and open source protocols in any combination to achieve functionality described in embodiments of the present invention represented by the ADEPT light peer, standard peer and peer exchange types. It should be noted that each ADEPT peer device can have capability to perform self-diagnostics and/or transactional data processing based in IoT sensor input and connected device interchanges ranging in complexity.

In embodiments of the present invention, light peers can comprise devices with low memory and storage capabilities. Some examples of ADEPT capable light peers can comprise devices such as, but not limited to, Raspberry Pi by Raspberry Foundation, Beaglebone by Beaglebone.org Foundation and Arduino board by Arduino LLC. Light peers can perform messaging, file sharing and comprise light wallets which have limited capability to store full blockchains and can rely on a trusted ADEPT peer for more complex blockchain transactions (e.g., blockchain mining/verification, crypto-currency exchange).

In embodiments of the present invention, standard peers can be devices that have more memory and computing capabilities than light peers. Standard peers can store blockchain information for a limited duration and can perform blockchain transactions for light peers in an ADEPT peer-to-peer network.

In embodiments of the present invention, peer exchanges can comprise devices with significant computing and storage capabilities. Peer exchanges can comprise similar capability of standard peers and can comprise a further capability of hosting marketplaces which can support functions such as, but not limited to, payments, analytical solutions, demand supply matching and compliance. Peer exchanges can store a full copy of blockchains and perform "mining" and/or transaction verification on the blockchains. It should be noted that in some embodiments of the present invention, a wallet (e.g., light wallet, optimized wallet and full wallet) can comprise a plurality of blockchains and in other embodiments of the present invention, one or more wallets can store separate data based on blockchain data type (e.g., wallets separated by contract types and/or trading partners).

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

FIG. 1 depicts a functional block diagram illustrating computing environment 100, in accordance with an embodiment of the present invention. Computing environment 100 comprises COMMUNICATION DEVICE 110, and COMPUTER SYSTEM 130, connected via NETWORK 140. COMMUNICATION DEVICE 110 and COMPUTER SYSTEM 130 can be desktop computers, laptop computers, specialized computer servers, IoT devices or the like. It should be noted that IoT devices can be embedded in COMPUTER SYSTEM 130 (not depicted) and/or COMMUNICATION DEVICE 110 or IoT devices can represent COMPUTER SYSTEM 130 and/or COMMUNICATION DEVICE 110 independently. In certain embodiments, COMMUNICATION DEVICE 110 and COMPUTER SYSTEM 130 represent computer systems utilizing clustered computers and components acting as a single pool of seamless resources via NETWORK 140. For example, such embodiments can be used in data center, cloud computing, storage area network (SAN), and network attached storage (NAS) applications. In general, COMMUNICATION DEVICE 110 and COMPUTER SYSTEM 130 are representative of any electronic devices, or combination of electronic devices, capable of executing computer readable program instructions, as described in detail with regard to FIG. 6.

In one embodiment of the present invention, COMPUTER SYSTEM 130 comprise USER APPLICATION(S) 132. USER APPLICATION(S) 132 can be a plurality of USER APPLICATION(S) 132 within COMPUTER SYSTEM 130. USER APPLICATION(S) 132 are applications that can perform functions such as, but not limited to, send messages, receive messages and operate IoT devices. In embodiments of the present invention, USER APPLICATION(S) 132 can comprise any combination of commercial or custom devices and/or software products associated with actions such as, but not limited to, operating, maintaining and interacting with IoT devices. It should be noted that USER APPLICATION(S) 132 can represent central remote IOT controllers and cloud services where operations beyond a single peer-to-peer network can be provided.

NETWORK 140 can be, for example, a local area network (LAN), a wide area network (WAN) such as, but not limited to, the Internet and Bluetooth by Bluetooth Special Interest Group (SIG), in any combination comprising wired, wireless, or fiber optic connections. In general, NETWORK 140 can be any combination of connections and protocols that can support communications between COMMUNICATION DEVICE 110 and COMPUTER SYSTEM 130, in accordance with an embodiment of the present invention.

In one embodiment of the present invention, COMMUNICATION DEVICE 110 comprises IoT DEVICE_L 112, IoT DEVICE_S 114 and IoT DEVICE_X 116. Correspondingly, IoT DEVICE_L 112 comprises ADEPT LIGHT PEER 118, IoT DEVICE_S 114 comprises ADEPT STANDARD PEER 120 and IoT DEVICE_X 116 comprises ADEPT PEER EXCHANGE 122. ADEPT LIGHT PEER 118, ADEPT STANDARD PEER 120 and ADEPT PEER EXCHANGE 122 can provide progressively greater function based on IoT device properties such as, but not limited to, processing capacity, storage capacity and application/functional requirements.

In one embodiment of the present invention, IoT DEVICE_L 112, IoT DEVICE_S 114 and IoT DEVICE_X 116 can be a plurality of IoT DEVICE_L(S) 112, IoT DEVICE_S(S) 114 and IoT DEVICE_X(S) 116 respectively. IoT DEVICE_L 112, IoT DEVICE_S 114 and IoT DEVICE_X 116 can be a plurality of components of COMMUNICATION DEVICE 110 and likewise, IoT DEVICE_L 112, IoT DEVICE_S 114 and IoT DEVICE_X 116 can be represented as COMMUNICATION DEVICE 110 in a stand-alone environment. IoT DEVICE_L 112, IoT DEVICE_S 114 and IoT DEVICE_X 116 can represent IoT devices that can comprise a plurality of sensors (not shown) and provide connectivity that can detect and respond to environmental and/or computer initiated events (e.g., telemetry). IoT DEVICE_L 112, IoT DEVICE_114 and IoT DEVICE_X 116 can comprise any combination of commercial or custom devices and/or software products associated with IoT devices. It should be noted that IoT devices connectivity can vary over time as IoT devices can attach/detach themselves to/from a network as needed. For example, an alarm system IoT device can connect to a network when a user enables a security system or a smoke-detector IoT device can connect to a network when predetermined threshold conditions are detected (e.g., weak battery alert).

In one embodiment of the present invention ADEPT LIGHT PEER 118, ADEPT STANDARD PEER 120 and ADEPT PEER EXCHANGE 122 can comprise functions such as, but not limited to, autonomous interconnection to a plurality of ADEPT peers, transfer data/files, perform messaging, store information and provide consensus based device coordination. ADEPT LIGHT PEER 118, ADEPT STANDARD PEER 120 and ADEPT PEER EXCHANGE 122 can comprise any combination of commercial or custom devices and/or software products associated with IoT device operation and more particularly in operating an ADEPT based architecture.

Figure 2:
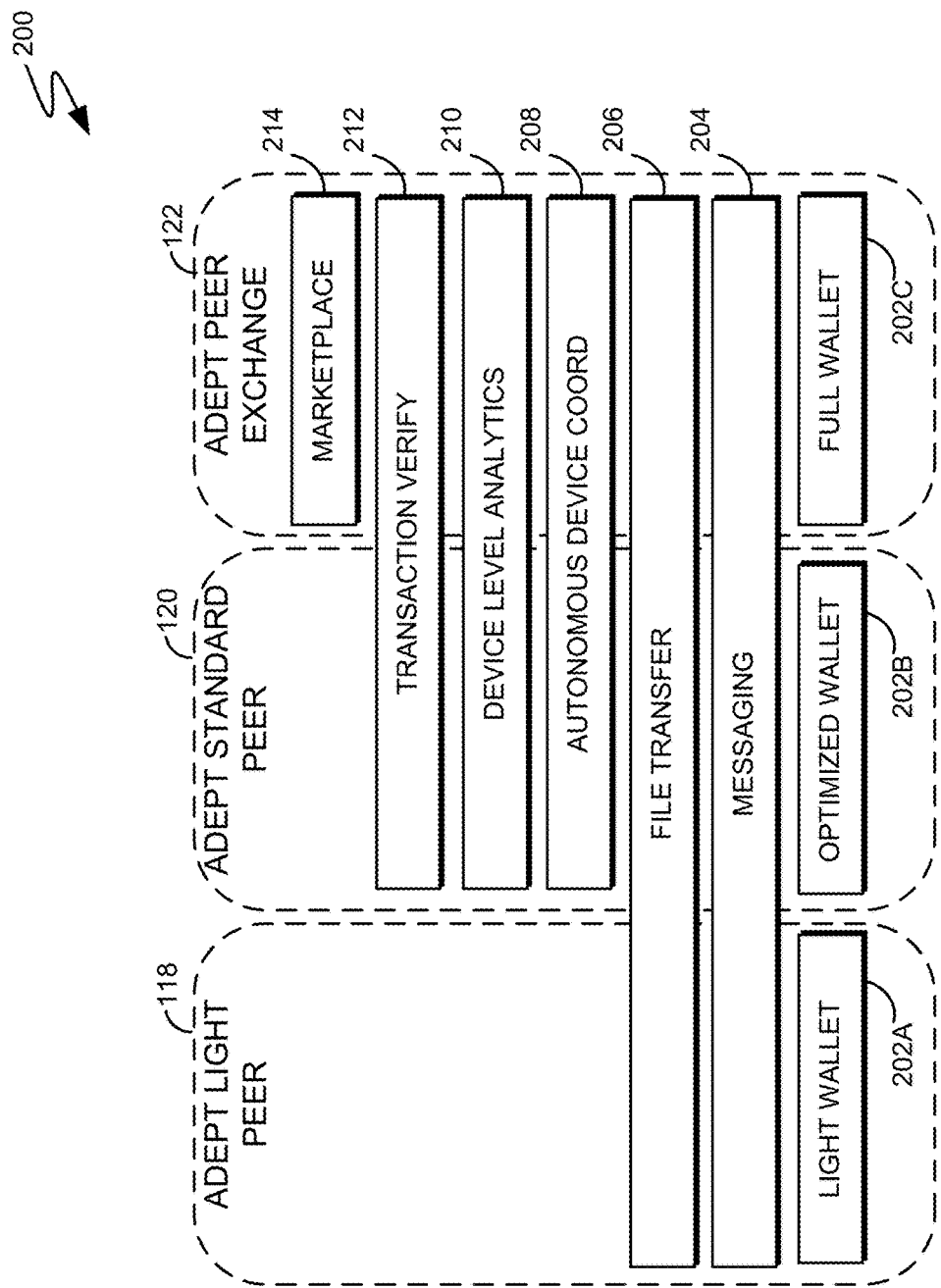
FIG. 2 depicts an IoT ADEPT peer autonomous device architecture, in accordance with an embodiment of the present invention.

FIG. 2 depicts an IoT ADEPT peer autonomous device architecture, in accordance with an embodiment of the present invention. ADEPT architecture 200 further decomposes to ADEPT LIGHT PEER 118, ADEPT STANDARD PEER 120 and ADEPT PEER EXCHANGE 122 where each peer comprises MESSAGING 204 and FILE TRANSFER 206.

In one embodiment of the present invention ADEPT LIGHT PEER 118, ADEPT STANDARD PEER 120 and ADEPT PEER EXCHANGE 122 further comprise LIGHT WALLET 202A, OPTIMIZED WALLET 202B and FULL WALLET 202C respectively. LIGHT WALLET 202A, OPTIMIZED WALLET 202B and FULL WALLET 202C can process and store distributed transactions. Transaction processing can be performed by technologies such as, but not limited to, blockchain. Blockchain can be used to create trust between devices, allow data to be stored on different devices while tracking the relationship between different owners/users of the data and establish contract exchange between trading partners. It should be noted that device and/or ADEPT operation data such as, but not limited to, device responsibilities, device relationships, autonomous device coordination rules, device service history and the device consensus service contracts can be stored in ADEPT peer wallets and/or other memory locations available to the ADEPT peers. It should be noted that stored service history can be comprise information such as, but not limited to, repair actions, warranty/contract status, service action statistics and parts replacement statistics.

In one embodiment of the present invention, LIGHT WALLET 202A can be used to track relationships and agreements that can be negotiated by ADEPT LIGHT PEER 118 with other ADEPT IoT devices, COMMUNICATION DEVICE 110 and/or COMPUTER SYSTEM 130. For example, LIGHT WALLET 202A can store blockchain(s) and/or portions of blockchain(s) and contracts associated with devices identified on blockchain(s). Further, LIGHT WALLET 202A can store referential information toward a peer-to-peer connected ADEPT STANDARD PEER 120 and/or ADEPT PEER EXCHANGE 122 where associated blockchain data can be stored when LIGHT WALLET 202A has limited storage space. It should be noted that authorization of ADEPT IoT devices can be executed on a shared registry such as, but not limited to, blockchain. For example, authorizaton can be executed between a user and a device and between two devices autonomously or with added user consent as identified on the blockchain. For example, the authorization capabilities of blockchain can provide a smartphone with a secure method of communication with a door lock and/or a user could authorize someone else to communicate with the door lock. ADEPT IoT authenticated relationships could be stored on the lock's IoT device and/or the smartphone which can communicate with each other as needed to ensure the authorized people have access to a secure area.

In one embodiment of the present invention, OPTIMIZED WALLET 202B comprises similar capabilities as LIGHT WALLET 202A and can be used to track relationships and agreements that can be negotiated by ADEPT STANDARD PEER 120 relationships with other ADEPT IoT devices, COMMUNICATION DEVICE 110 and/or COMPUTER SYSTEM 130. For example, OPTIMIZED WALLET 202B can store blockchain(s) and contracts with a device(s) identified on blockchain(s).

In one embodiment of the present invention, FULL WALLET 202C comprises similar capabilities as OPTIMIZED WALLET 202B and can be used to track relationships and agreements that can be negotiated by ADEPT PEER EXCHANGE 122 relationships with other ADEPT IoT devices, COMMUNICATION DEVICE 110 and/or COMPUTER SYSTEM 130. For example, FULL WALLET 202C can store blockchain(s) and contracts with device(s) identified on blockchain(s). Further, FULL WALLET 202C can store data for other services negotiated/bartered by ADEPT PEER EXCHANGE 122 such as, but not limited to, marketplace transactions. For example, ADEPT PEER EXCHANGE 122 could negotiate energy allocations with a Heating, Ventilation and Air Conditioning (HVAC) system to "buy" and "sell" energy credits.

In one embodiment of the present invention MESSAGING 204, can be a plurality of MESSAGING(S) 204 within ADEPT LIGHT PEER 118, ADEPT STANDARD PEER 120 and ADEPT PEER EXCHANGE 122. MESSAGING 204 can enable communication in an understandable format/protocol between a plurality of COMMUNICATION DEVICE 110 and COMPUTER SYSTEM 130. ADEPT LIGHT PEER 118, ADEPT STANDARD PEER 120 and ADEPT PEER EXCHANGE 122 can operate MESSAGING 204 using a protocol such as, but not limited to, telehash by Telehash Organization (i.e., telehash.org). In embodiments of the present invention, MESSAGING 204 can comprise any combination of commercial or custom devices and/or software products associated with enabling a peer-to-peer messaging protocol in a "trustless" consensus based network to share distributed information. It should be noted that MESSAGING 204 can provide secure end-to-end encryption within an ADEPT peer-to-peer network.

In one embodiment of the present invention FILE TRANSFER 206, can enable ADEPT LIGHT PEER 118, ADEPT STANDARD PEER 120 and ADEPT PEER EXCHANGE 122 with the ability to transfer data/files within the ADEPT peer network. Embodiments of the present invention can transfer blocks of data among a plurality of IoT devices using technologies such as, but not limited to, BitTorrent. It should be noted, while IoT devices can join and leave a network periodically, a distributed file sharing technology can successfully enable decentralized autonomous operations. It should be further noted that factors such as, but not limited to, storage capacity, IoT device processing speed/power can vary among ADEPT LIGHT PEER 118, ADEPT STANDARD PEER 120 and ADEPT PEER EXCHANGE 122 such that distributed file sharing among many IoT devices in a peer-to-peer network can be advantageous.

ADEPT STANDARD PEER 120 and ADEPT PEER EXCHANGE 122 further comprise AUTONOMOUS DEVICE COORD 208, DEVICE LEVEL ANALYTICS 210 and TRANSACTION VERIFY 212.

In one embodiment of the present invention, AUTONOMOUS DEVICE COORD 208 represents the ability of ADEPT STANDARD PEER 120 and ADEPT PEER EXCHANGE 122 to operate and manage functions such as, but not limited to, communication, cooperation and file sharing with connected devices in an ADEPT peer-to-peer network. It should be noted that as ADEPT LIGHT PEER 118, ADEPT STANDARD PEER 120 and ADEPT PEER EXCHANGE 122 participate in a decentralized peer-to-peer network, the ADEPT IoT devices, based on their capabilities, can forward transactions toward other ADEPT IoT devices on behalf of transaction originating ADEPT IoT devices in the peer-to-peer network. It should be further noted that AUTONOMOUS DEVICE COORD 208 can detect and interact with network connected trading partners to enable an ADEPT network interchange with contracted service providers. For example, a service provider (e.g., trading partner) can be identified on a service contract (e.g., blockchain party). If a need to exchange information with the service provider is determined, then the ADEPT network can establish a connection beyond the peer-to-peer ADEPT network (e.g., Internet connection) to transact and perform consensus based value exchanges.

In one embodiment of the present invention, DEVICE LEVEL ANALYTICS 210, represents the ability of ADEPT STANDARD PEER 120 and ADEPT PEER EXCHANGE 122 to perform data analytics to determine and manage data available within an ADEPT peer-to-peer network. DEVICE LEVEL ANALYTICS 210 can analyze data (e.g., diagnostic input) from various sources to make autonomous decisions such as, but not limited to, determining the need for a resource, offering computational resources to another IoT device and acting on sensor information shared within the peer-to-peer network. For example, an appliance IoT can receive diagnostic input to detect water flow rate change below a predetermined threshold. The flow rate event detection could indicate that a water filter needs replacement however, DEVICE LEVEL ANALYTICS 210 can compare parts replacement history stored on the ADEPT device and/or stored on a peer-to-peer networked device to determine if a current and/or past filter replacement history conforms to a predetermined life span. If a filter replacement schedule comparison indicates a premature failure, additional diagnostics can be executed to determine if other part failure(s) may be contributing to the sensed reduced water flow event. Based on DEVICE LEVEL ANALYTICS 210 results, autonomous actions can be executed by the ADEPT peer(s) to initiate service self-service. It should be noted that analytic data and reports can be transferred with FILE TRANSFER 206 among an ADEPT peer-to-peer network and/or network connected service provider(s). It should be further noted that diagnostic input can be received by an ADEPT device from sources such as, but not limited to, the ADEPT device attached sensor input, the ADEPT device analytic results actions, connected ADEPT device(s) analytic result actions and connected ADEPT device(s) sensor input.

In one embodiment of the present invention, TRANSACTION VERIFY 212, can provide consensus based functions such as, but not limited to, validate authorization and service requests within the ADEPT peer-to-peer network to create and accept permissions and/or contract for services and set roles and/or responsibilities between IoT devices and/or network connected service provider(s). For example, an ADEPT peer can request a part from a service provider. With reference to an ADEPT contract between an ADEPT enabled device and a service provider, the parts request transaction can be verified as authentic for both requesting and supplying parties when a plurality of ADEPT networked peers confirm blockchain match (e.g., ledger consensus).

In one embodiment of the present invention, ADEPT PEER EXCHANGE 122 further comprises MARKETPLACE 214. With MARKETPLACE 214, ADEPT PEER EXCHANGE 122 can negotiate service exchanges with networked devices, resources and/or network connected service provider(s). For example, MARKETPLACE 214 can be used to barter with other IoT devices for energy usage or in another example, MARKETPLACE 214 can buy/sell processing capacity to perform a software update or display advertisements. In yet another example, MARKETPLACE 214 can connect with service providers to initiate creation of new service contracts when a need for a consensus service contract is determined. An ADEPT peer can create service contract offers and send service contract offers toward service providers. Service providers can determine if they accept received contract offers and can send one or more contract acceptance toward the requesting ADEPT peer. Upon receipt of service contract acceptances, consensus service contracts can be created (e.g., blockchain) by a requesting ADEPT peer and shared among the ADEPT peer network to enable trusted (e.g., consensus based) exchange of services and/or parts orders as ADEPT peer device(s) operate. It should be noted that determination of the need for a consensus contract can be identified by events such as, but not limited to, activating an ADEPT peer device (e.g., warranty activation), predetermined ADEPT peer device(s) service records/profile and identified user established agreements (e.g., product service agreement) sent toward ADEPT peer device(s).

Figure 3:
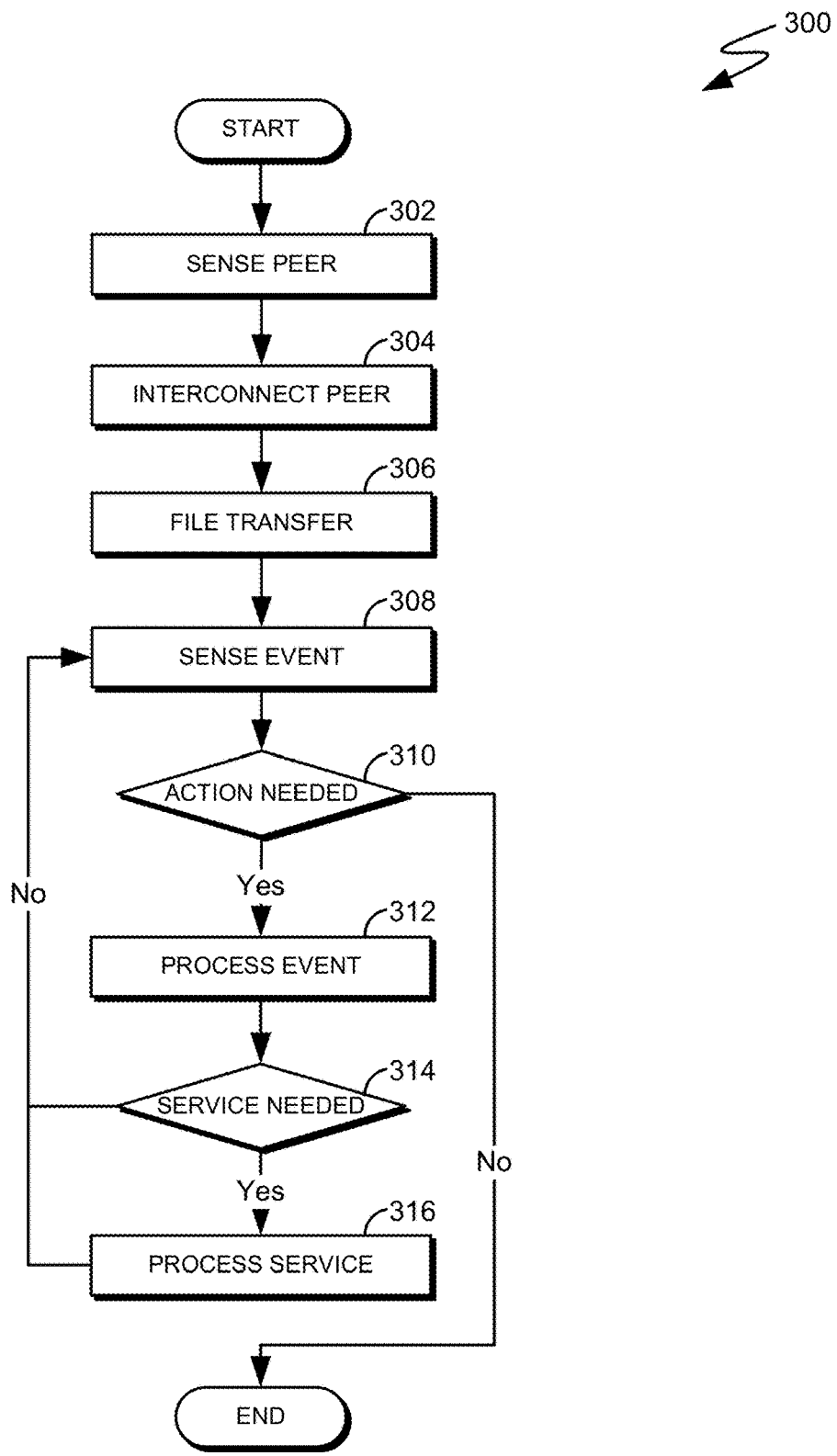
FIG. 3 illustrates a flowchart depicting ADEPT peer self-servicing interactions, in accordance with an embodiment of the present invention.

FIG. 3 illustrates a flowchart depicting ADEPT peer self-servicing interactions, in accordance with an embodiment of the present invention. Flow diagram 300 ADEPT peer self-service processing can be a continuous process operated by an ADEPT IoT device participating in an ADEPT peer-to-peer network to sense and respond to ADEPT peer self-servicing interactions.

In operation SENSE PEER 302, an ADEPT IoT device (e.g., ADEPT LIGHT PEER 118, ADEPT STANDARD PEER 120 and ADEPT PEER EXCHANGE 122) can determine if at least one of a plurality of other ADEPT LIGHT PEER 118, ADEPT STANDARD PEER 120 and ADEPT PEER EXCHANGE 122 are available to establish/extend a peer-to-peer network. A peer list can be created and maintained by each ADEPT IoT device as other ADEPT IoT devices join/leave the peer-to-peer network. It should be noted that the peer list can be stored in ADEPT IoT devices memory and/or respective LIGHT WALLET 202A, OPTIMIZED WALLET 202B and FULL WALLET 202C to identify which ADEPT IoT devices are in range and what peer-to-peer connections are established. It should be further noted that the peer list enables ADEPT IoT devices to differentiate between known and unknown peers in a peer-to-peer network where the relationships between peer devices can be classified by terms such as, but not limited to, trusted, semi-trusted and trustless. The peer list classification terms can be based on ADEPT IoT device predetermined rules.

In operation INTERCONNECT PEER 304, the ADEPT IoT device can send messages toward other peers and/or can receive messages from other peers to join a peer-to-peer network. A level of trust can be established with another ADEPT IoT device to create a peer-to-peer network interconnection between ADEPT peers by using technologies such as, but not limited to, blockchain. With blockchain, ADEPT peers can establish authenticated and/or encrypted connectivity with trusted, semi-trusted and trustless peer-to-peer devices.

In operation FILE TRANSFER 306, authenticated data and/or transactions can be sent and/or received between peers. Examples of data and/or transactions can comprise code updates, reports, diagnostics and service history based on blockchain authentication and/or consensus.

In operation SENSE EVENT 308, an event can be received from a peer and/or sensor within the IoT network. Examples of events that can occur can be a sensor meeting a threshold value (e.g., humidity level exceeded), instrumented part fails (e.g., filter is plugged, valve fails to close, etc.), a device needs attention (e.g., power loss), periodic alert (e.g., diagnostics report due), environmental event (e.g., smoke detected), user instruction message (e.g., parameter change) and responsibility negotiation (e.g., marketplace request).

Based on operation SENSE EVENT 308, event identification, operation ACTION NEEDED 310, determines if action is needed to be taken by the ADEPT IoT device. Action determination can be based on a range of actions the IoT device is designed to manage and if the IoT device is capable of performing the action. In the condition where operation ACTION NEEDED 310 determines no action is needed, then the flow ends. An action decision can be determined based on analytic processing within an ADEPT peer onboard analytics and/or received from one or more ADEPT peer analytics results. In the condition where operation ACTION NEEDED 310 determines action is needed, then the flow proceeds to operation PROCESS EVENT 312.

In operation PROCESS EVENT 312, an event can be processed by an IoT device taking action based on the responsibilities of the ADEPT IoT device and/or based on ADEPT peer relationships. An ADEPT IoT device can perform actions, such as, but not limited to, message handling, message generation, consensus determination participation, peer information management, contract creation, contract execution, contract management, file management, external API invocation and triggering other events. An example of IoT event processing can comprise actions to negotiate service (e.g., contract creation) from other devices in the peer-to-peer network. For example, ADEPT LIGHT PEER 118 may need a firmware update and ADEPT LIGHT PEER 118 associated IoT DEVICE_L 112 has insufficient free memory to retain temporary install files. ADEPT LIGHT PEER 118 could negotiate (e.g., contract) with a connected ADEPT PEER EXCHANGE 122 to store data (e.g., file transfer) on an associated IoT DEVICE_X 116 in order to complete the update.

In operation SERVICE NEEDED 314, an operation ACTION NEEDED 310 can comprise a need for actions to be managed by trading partners beyond an ADEPT peer-to-peer network (e.g., service order send toward service provider). For example, parts and/or service may be needed such as, but not limited to, a replacement part, consumable part and repair call. If operation SERVICE NEEDED 314 is no, then processing proceeds toward operation SENSE EVENT 308 to receive a next event, otherwise operation continues toward operation PROCESS SERVICE 316.

In operation PROCESS SERVICE 316, a connection can be made between the ADEPT peer-to-peer network and a service provider(s) to deliver service(s) and/or part(s). Existing contracts can be referenced and/or new contacts can be initiated based on predetermined service provider rules received by and/or stored in an ADEPT peer. Service provider communication can provide a transaction capability such as, but not limited to, consensus based contract, order, receipt, delivery and diagnostic information exchange. It should be noted that ADEPT device participating in an ADEPT peer-to-peer network can vary in capability and connectivity with service providers. For example, it is possible that an ADEPT LIGHT PEER 118 can determine a service part need and negotiate with a connected ADEPT PEER EXCHANGE 122 to share service ordering and/or service contract negotiation activities between the ADEPT LIGHT PEER 118 and a service provider to deliver a service(s). When operation SERVICE NEEDED 314 is complete, processing proceeds toward operation SENSE EVENT 308 to receive a next event.

Figure 4:
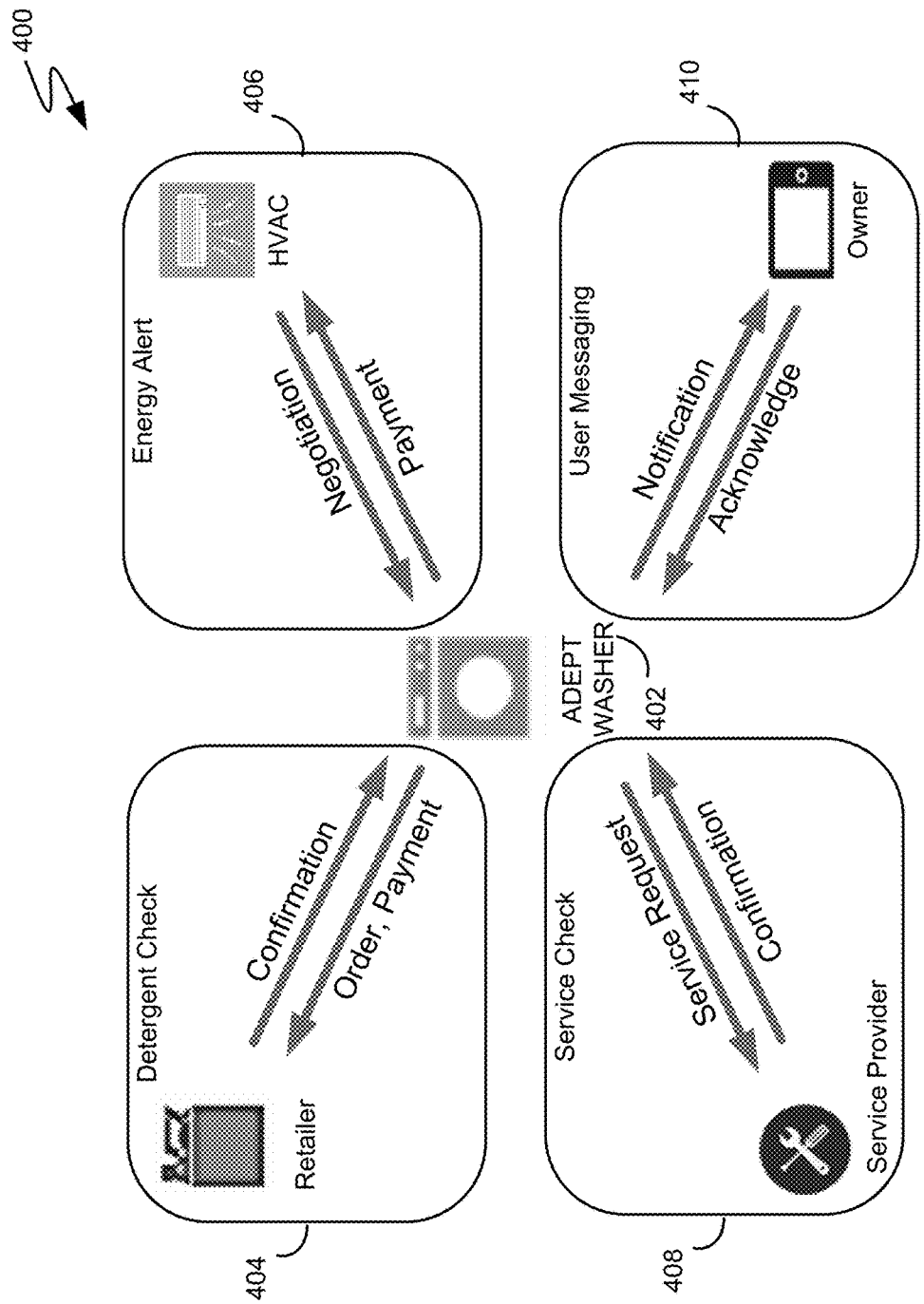
FIG. 4 depicts a sample implementation of an IoT ADEPT peer device operation, in accordance with an embodiment of the present invention.

FIG. 4 depicts a sample implementation of an IoT ADEPT peer device operation, in accordance with an embodiment of the present invention. ADEPT sample operation 400 comprises ADEPT WASHER 402, DETERGENT CHECK 404, ENERGY ALERT 406, SERVICE CHECK 408 and USER MESSAGING 410. It should be noted that ADEPT sample operation 400, refers to enabling technologies such as, but not limited to, blockchain for illustration purposes.

In one embodiment of the present invention, ADEPT WASHER 402 can be ADEPT IoT enabled washing machine. In an example, ADEPT WASHER 402 can determine when detergent levels are low based on sensors and/or messages sent toward ADEPT WASHER 402. ADEPT WASHER 402 can send messages toward USER MESSAGING 410 to notify a user to re-stock detergent and/or USER MESSAGING 410 can send messages toward DETERGENT CHECK 404 where detergent can be ordered from a service provider. Billing/payment can be made with authenticated information on a blockchain exchanged between ADEPT WASHER 402 and a service provider. The authenticated information can comprise information such as, but not limited to, device ID, crypto-currency exchange and contract ID. The service provider can also send confirmations such as, but not limited to, order acknowledgment, shipping details and billing information toward ADEPT WASHER 402 and/or a user.

In one embodiment of the present invention, ENERGY ALERT 406 can operate in an energy managed environment where peak energy usage may be governed. In this example, ADEPT WASHER 402 can negotiate/barter energy usage with an HVAC system. After successful negotiation on a blockchain, HVAC can limit energy demand (e.g., delay heat, air conditioning) while ADEPT WASHER 402 operates. Conversely, ADEPT WASHER 402 could pause periodically between wash cycles based on autonomous coordination with the HVAC system.

In one embodiment of the present invention, SERVICE CHECK 408 operates when ADEPT WASHER 402 determines that service may be needed. For example, a filter may be plugged and ADEPT WASHER 402 can determine water flow has diminished. ADEPT WASHER 402 can send messages toward USER MESSAGING 410 to notify a user that an event has occurred and/or SERVICE CHECK 408 to send a service request toward a service vendor. The service request can comprise information such as, but not limited to, part number failing, machine repair history, error codes, software version and analytic reports. The service vendor could determine actions to take based on information received and confirm actions to take such as, but not limited to, dispatch a service technician and/or parts. It should be noted that machine repair history is one example of ADEPT IoT device having responsibility of its own data in a peer-to-peer distributed architecture. It should be further noted that USER MESSAGING 410 can participate in communication with ADEPT WASHER 402, DETERGENT CHECK 404, ENERGY ALERT 406, SERVICE CHECK 408 based on a plurality of implementations of embodiments of the present invention.

Figure 5:
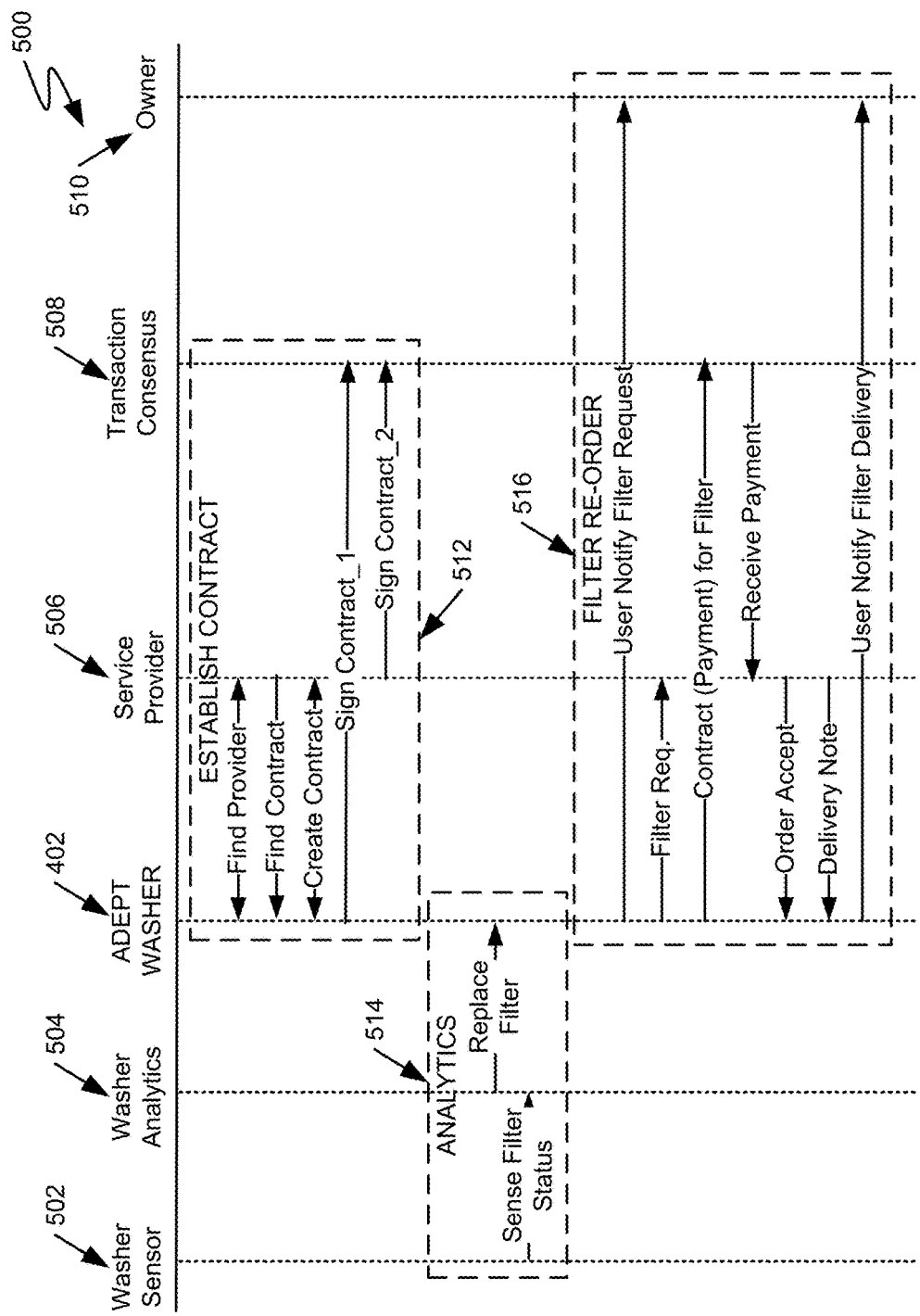
FIG. 5 depicts transactions in a sample digital value exchange scenario of an IoT ADEPT peer device, in accordance with an embodiment of the present invention.

FIG. 5 depicts transactions in a sample digital value exchange scenario of an IoT ADEPT peer device, in accordance with an embodiment of the present invention. Sample ADEPT transaction exchange 500 depicts communication self-servicing interactions that can occur during an ADEPT WASHER 402 sensed filter failure. It should be noted that ADEPT transaction exchange 500, refers to enabling technologies such as, but not limited to, blockchain for illustration purposes.

Item ADEPT WASHER 402 comprises item Washer Sensor 502 and item Washer Analytics 504 that can be functional components of an ADEPT IoT device. Item Service Provider 506 depicts a seller of goods and service (e.g., washer detergent). Item Owner 510 depicts a communications device that receives messages representing an owner/user interested in the autonomous operation of ADEPT WASHER 402.

Item Transaction Consensus 508 depicts a distributed method to verify and record value (e.g., digital currency) exchange between ADEPT peer(s) and/or other partners (e.g., item Service Provider 506) identified on a blockchain. Blockchain can represent item Transaction Consensus 508 where blockchains (e.g., ledgers) are maintained as value is exchanged among trading partners (e.g., ADEPT peer(s), item Service Provider 506).

Item ESTABLISH CONTRACT 512, item ANALYTICS 514 and item FILTER RE-ORDER 516 represent groupings of transactions comprising communication exchanges that can occur while operating SERVICE CHECK 408.

Item ESTABLISH CONTRACT 512 can be autonomously performed between ADEPT WASHER 402 and item Service Provider 506 where an agreement can be negotiated between trading partners. When a need for a part and/or service from a Service Provider is determined (e.g., item ANALYTICS 514), 'Find Provider' can search information sources such as, but not limited to, existing consensus service contracts (e.g., warranty, parts, service) and authorized service providers can be searched to satisfy a parts and/or service need. A consensus service contract can be identified as a contract (e.g., blockchain) structure identifying an agreement between a consumer (e.g., ADEPT WASHER 402) and a service provider based on terms to deliver parts and/or service. The consensus service contracts can comprise data such as, but not limited to, service provider identifiers, service identifiers, contract terms and contract values. Contract terms can comprise attributes such as, but not limited to, replaceable parts list, service hours based on contract type and available repair task identifiers. Contract values can comprise data such as, but not limited to, part values, part useful life, part mean time between failure (MTBF), part identification substitution rules and average repair time per repair task.

If a Service Provider 506 is found, a search is conducted to determine if an existing contract (e.g., warranty, service contract, etc.) exists for the parts and/or service need. If a service provider is not found, a user can be notified (e.g., USER MESSAGING 410) of the parts and/or service need (not depicted). If a contract is not found in 'Find Contract', a new contract can be created. In the example, a contract can be created for a replacement filter where 'Create Contract' messaging can comprise attributes such as, but not limited to, contract identifier, value, terms and conditions and can be shared between ADEPT WASHER 402 and item Service Provider 506. With an agreeable contract defined, ADEPT WASHER 402 can send 'Sign Contract_1' (e.g., service contract offer) transaction toward item Transaction Consensus 508 to register authorization of the detergent contract. Likewise, item Service Provider 506 can send a corresponding 'Sign Contract_2' (e.g., service contract acceptance) transactions toward item Transaction Consensus 508 to complete authorization of the filter contract.

Item ANALYTICS 514 can comprise function that is executing on an IoT device and/or interfacing computing device with ADEPT WASHER 402. For example, item ANALYTICS 514 comprises a 'Sense Filter Status' message that can be sent toward item Washer Analytics 504 where the current water flow rate in ADEPT WASHER 402 is sensed. Item ANALYTICS 514 can process received 'Sense Filter Status' message and based on item ANALYTICS 514, predetermined decision rules can identify a need for a replacement filter. If a need to replacement filter exists, item ANALYTICS 514 can send 'Replace Filter' message toward ADEPT WASHER 402 to initiate item FILTER RE-ORDER 516 process.

Item FILTER RE-ORDER 516 can operate autonomously with ADEPT WASHER 402. For example, based on an item ANALYTICS 514 triggering event, 'Replace Filter', ADEPT WASHER 402 can send a filter request (i.e., 'Filter Req.') toward the service provider (e.g., item Service Provider 506). The filter request can comprise information such as, but not limited to, ADEPT Washer identifier and contract reference established from item ESTABLISH CONTRACT 512. A corresponding 'User Notify Filter Request' message can be sent toward item Owner 510 by ADEPT WASHER 402. Additionally, ADEPT WASHER 402 can send 'Contract (Payment) for Filter' (e.g., digital currency) toward item Transaction Consensus 508, where an example blockchain technology can be used, to authenticate, by consensus, ADEPT WASHER 402 (e.g., buying party) transaction for payment toward item Service Provider 506. It should be noted that a contract payment can be a value exchange for the service provider for records purpose. For example, a service part covered under warranty would not be a monetary exchange however the Service Provider 506 can use the value exchange as a method to monitor Service Provider 506 cost of maintenance. Correspondingly, item Transaction Consensus 508 can send 'Receive Payment' transaction toward item Service Provider 506 to collect payment for the determent associated to the contract (e.g., item ESTABLISH CONTRACT 512). Further, item Service Provider 506 can send 'Order Accept' and 'Delivery Note' toward ADEPT WASHER 402 to acknowledge that the filter request can be satisfied and/or when replenishment will be complete. Lastly, ADEPT WASHER 402 can send 'User Notify Filter Delivery' message toward Item Owner 510 as completion notification of the autonomous filter replenishment operation. It should be noted that Item FILTER RE-ORDER 516 is an example of a replacement part order and a request for service and/or dispatch of a repair technician can follow a similar process flow.

Figure 6:
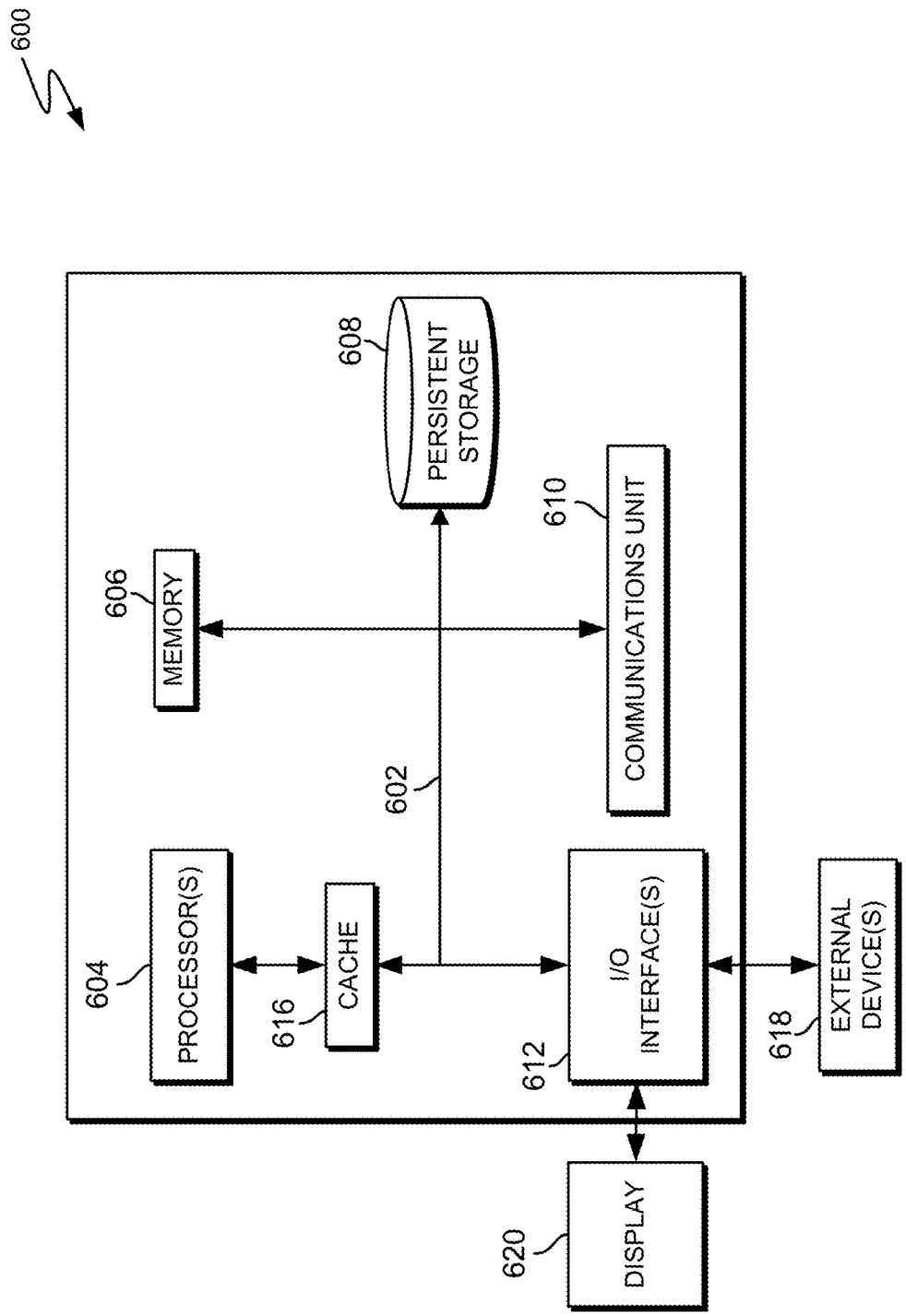
FIG. 6 depicts a block diagram of components of the server and/or the computing device, in accordance with an embodiment of the present invention.

FIG. 6 depicts a block diagram of components of the server and/or the computing device, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as, microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as, microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as, a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as, punch-cards or raised structures in a groove having instructions recorded thereon, and any suitable combination of the foregoing. A computer readable storage medium, as used herein, is not to be construed as being transitory signals per se, such as, radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as, the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, for autonomous self-servicing of decentralized peer-to-peer devices in an autonomous decentralized peer-to-peer telemetry (ADEPT) environment, the method comprising:
    connecting, by a first ADEPT peer, to one or more ADEPT peers based on peer consensus;
    determining, by the first ADEPT peer, one or more service needs based on receiving one or more diagnostic inputs;
    identifying, by the first ADEPT peer, one or more service providers based on one or more consensus service contracts associated to the one or more service needs;
    creating, by the first ADEPT peer, one or more service orders based on the one or more service providers; and
    outputting, by the first ADEPT peer, the one or more service orders to the one or more service providers based on the one or more consensus service contracts.

2. The method of claim 1, wherein the one or more consensus service contracts are created by:
    sending, by the first ADEPT peer, one or more service contract offers associated to the one or more service providers;
    receiving, by the first ADEPT peer, one or more service contract acceptances associated to the one or more service contract offers; and
    outputting, by the first ADEPT peer, the one or more consensus service contracts toward the one or more ADEPT peers.

3. The method of claim 2 wherein the one or more service contract offers are based on activating the first ADEPT peer device, predetermined the first ADEPT peer device service records, predetermined ADEPT peer device service profile and user established agreements.

4. The method of claim 1 wherein the one or more diagnostic inputs comprise at least one of one or more sensor input, the first ADEPT peer analytic results actions, the one or more ADEPT peer analytic result actions and the one or more ADEPT peer sensor input.

5. The method of claim 1, wherein the one or more ADEPT peers, comprises one or more wallets comprising at least one of one or more device responsibilities, one or more device relationships, one or more autonomous device coordination, one or more service history and the one or more consensus service contracts.

6. The method of claim 1, wherein the one or more consensus service contracts comprise at least one of one or more service provider identifiers, one or more service identifiers, one or more contract terms and one or more contract values.

7. The method of claim 5 wherein the one or more service history comprises at least one of one or more repair actions, one or more contract status, one or more service action statistics and one or more parts replacement statistics.

8. A computer program product, for autonomous self-servicing of decentralized peer-to-peer devices in an autonomous decentralized peer-to-peer telemetry (ADEPT) environment, the computer program product comprising:
    one or more computer readable storage media and program instructions stored on the one or more computer readable storage media, the program instructions comprising:
        program instructions to, connect, by a first ADEPT peer, to one or more ADEPT peers based on peer consensus;
        program instructions to, determine, by the first ADEPT peer, one or more service needs based on receiving one or more diagnostic inputs;
        program instructions to, identify, by the first ADEPT peer, one or more service providers based on one or more consensus service contracts associated to the one or more service needs;
        program instructions to, create, by the first ADEPT peer, one or more service orders based on the one or more service providers; and
        program instructions to, output, by the first ADEPT peer, the one or more service orders to one or more service providers based on the one or more consensus service contracts.

9. The computer program product of claim 8, wherein the one or more consensus service contracts are created by:
    program instructions to, send, by the first ADEPT peer, one or more service contract offers associated to the one or more service providers;
    program instructions to, receive, by the first ADEPT peer, one or more service contract acceptances associated to the one or more service contract offers; and
    program instructions to, output, by the first ADEPT peer, the one or more consensus service contracts toward the one or more ADEPT peers.

10. The computer program product of claim 9 wherein the one or more service contract offers are based on activating the first ADEPT peer device, predetermined the first ADEPT peer device service records, predetermined ADEPT peer device service profile and user established agreements.

11. The computer program product of claim 8 wherein the one or more diagnostic inputs comprise at least one of one or more sensor input, the first ADEPT peer analytic results actions, the one or more ADEPT peer analytic result actions and the one or more ADEPT peer sensor input.

12. The computer program product of claim 8, wherein the one or more ADEPT peers, comprises one or more wallets comprising at least one of one or more device responsibilities, one or more device relationships, one or more autonomous device coordination, one or more service history and the one or more consensus service contracts.

13. The computer program product of claim 8, wherein the one or more consensus service contracts comprise at least one of one or more service provider identifiers, one or more service identifiers, one or more contract terms and one or more contract values.

14. The computer program product of claim 12, wherein the one or more service history comprises at least one of one or more repair actions, one or more contract status, one or more service action statistics and one or more parts replacement statistics.

15. A computer system, for autonomous self-servicing of decentralized peer-to-peer devices in an autonomous decentralized peer-to-peer telemetry (ADEPT) environment, the computer system comprising:
one or more computer processors;
one or more computer readable storage media;
program instructions stored on the one or more computer readable storage media for execution by at least one of the one or more computer processors, the program instructions comprising:
program instructions to, connect, by a first ADEPT peer, to one or more ADEPT peers based on peer consensus;
program instructions to, determine, by the first ADEPT peer, one or more service needs based on receiving one or more diagnostic inputs;
program instructions to, identify, by the first ADEPT peer, one or more service providers based on one or more consensus service contracts associated to the one or more service needs;
program instructions to, create, by the first ADEPT peer, one or more service orders based on the one or more service providers; and
program instructions to, output, by the first ADEPT peer, the one or more service orders to one or more service providers based on the one or more consensus service contracts.

16. The computer system of claim 15, wherein the one or more consensus service contracts are created by:
program instructions to, send, by the first ADEPT peer, one or more service contract offers associated to the one or more service providers;
program instructions to, receive, by the first ADEPT peer, one or more service contract acceptances associated to the one or more service contract offers; and
program instructions to, output, by the first ADEPT peer, the one or more consensus service contracts toward the one or more ADEPT peers.

17. The computer system of claim 16 wherein the one or more service contract offers are based on activating the first ADEPT peer device, predetermined the first ADEPT peer device service records, predetermined ADEPT peer device service profile and user established agreements.

18. The computer system of claim 15 wherein the one or more diagnostic inputs comprise at least one of one or more sensor input, the first ADEPT peer analytic results actions, the one or more ADEPT peer analytic result actions and the one or more ADEPT peer sensor input.

19. The computer system of claim 15, wherein the one or more ADEPT peers, comprises one or more wallets comprising at least one of one or more device responsibilities, one or more device relationships, one or more autonomous device coordination, one or more service history and the one or more consensus service contracts.

20. The computer system of claim 15, wherein the one or more consensus service contracts comprise at least one of one or more service provider identifiers, one or more service identifiers, one or more contract terms and one or more contract values.

* * * * *